United States Patent [19]

Neumann et al.

[11] Patent Number: 5,535,480
[45] Date of Patent: Jul. 16, 1996

[54] FLOOR PROTECTORS

[75] Inventors: Tom Neumann, Sherwood Park; Bruce Buckwold; Richard Buckwold, both of Saskatoon, all of Canada

[73] Assignee: Glide N' Guard Floor Protection Ltd., Saskatoon, Canada

[21] Appl. No.: 395,658

[22] Filed: Feb. 28, 1995

Related U.S. Application Data

[63] Continuation of Ser. No. 144,245, Nov. 1, 1993, abandoned.

[30] Foreign Application Priority Data

Oct. 6, 1993 [CA] Canada ................................ 2107814

[51] Int. Cl.$^6$ .................................................. A47B 91/06
[52] U.S. Cl. ........................... 16/42 R; 428/58; 428/119
[58] Field of Search ...................... 428/58, 119; 108/143, 108/56.1, 56.3; 16/42 R; 52/177; 404/35, 41

[56] References Cited

U.S. PATENT DOCUMENTS

| 2,680,698 | 6/1954 | Schnee | 404/35 |
| 4,468,910 | 9/1984 | Morrison | 428/57 |
| 4,973,505 | 11/1990 | Bielous | 428/58 |

*Primary Examiner*—Alexander S. Thomas
*Attorney, Agent, or Firm*—Murray E. Thrift; Adrian D. Battison

[57] ABSTRACT

A floor protector protects floors against damage from heavy objects supported on or sliding across the floor and reduces the effort required to move the objects. The protector includes an elongate web with raised lips along its opposite edges and interlocking formations on its opposite ends. The interlocking formations allow the connection of plural strips end-to-end.

8 Claims, 2 Drawing Sheets

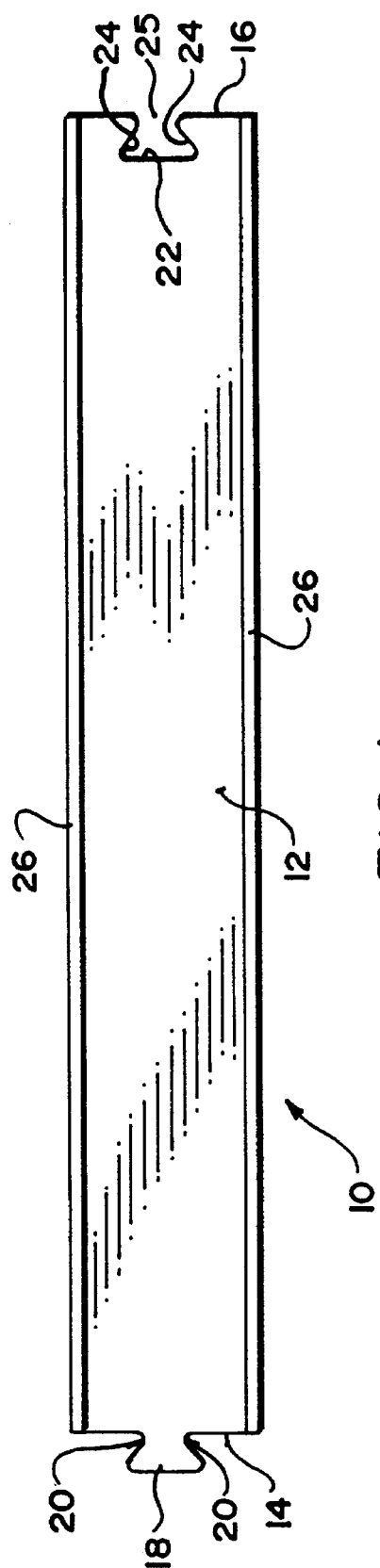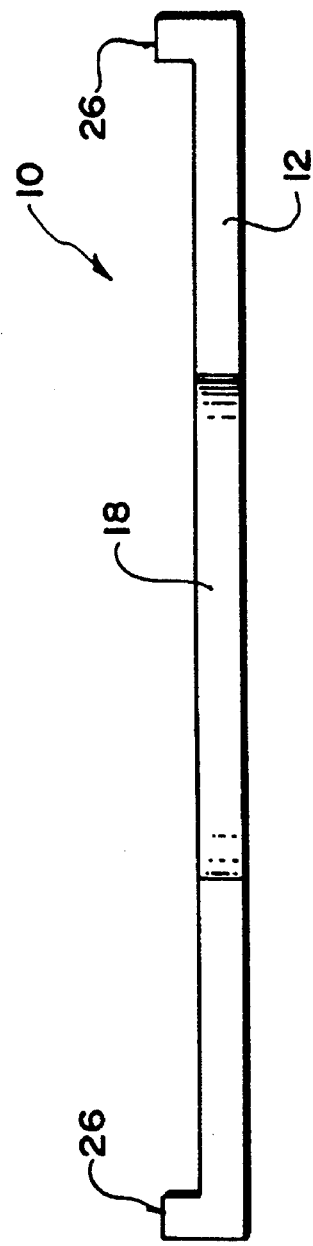

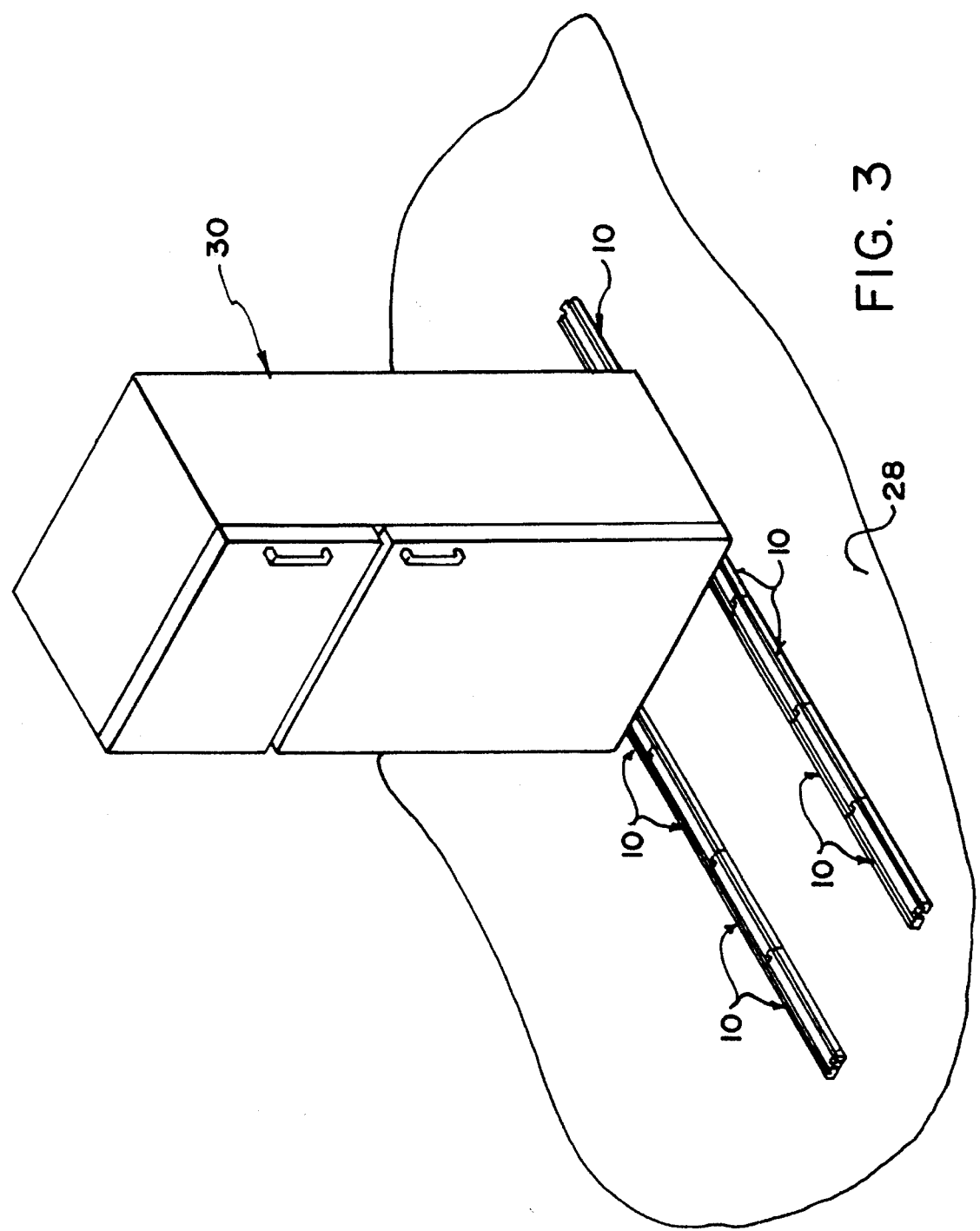

FLOOR PROTECTORS

This application is a continuation Ser. No. 08/144,245, filed Nov. 1, 1993, now abandoned.

FIELD OF THE INVENTION

The present invention relates to floor protectors and more particularly to a device useful in supporting or moving heavy objects on a floor. The protectors serve to protect floors against damage caused by heavy objects, and also to ease the effort required to move such objects.

BACKGROUND

Heavy objects, for example appliances and heavy furniture, are liable to damage floors on which they are supported, especially in movement of the objects across the floors. All types of floors, including vinyl, hardwood and ceramic are subject to such damage, with modern vinyl of the type commonly used in kitchen flooring being particularly susceptible. The physical effort required to move such items is another significant problem, particularly where the object does not slide readily on the floor or floor covering in question.

In U.S. Pat. No. 5,057,356, issued 15 Oct. 1991 to Terry C. Smith it is proposed to reduce damage to flooring caused by a heavy appliance by supporting the appliance on a secondary floor surface resting on the floor to be protected and supporting the appliance. To provide for movement of the appliance away from its normal position a temporary additional support surface is provided which butts against the stationary support so that the appliance can be moved from one support to the other without being placed directly on the floor. This prior art system is based on the quasi-permanent use of the stationary support. It also requires that the stationary support be butted against a wall to ensure that it does not move as a heavy appliance slides onto the support. This prior art system does not provide for the protection of a floor during the transportation of an appliance or other heavy object across a floor, for example during installation or removal.

The present invention is concerned with a floor protector that allows the movement of heavy objects across any floor, while protecting the floor against scratching, gouging or other damage.

SUMMARY

According to the present invention there is provided a floor protector for use in supporting or moving heavy objects, said protector comprising an elongate strip of hard plastic material with a smooth upper surface, the strip having first and second interlocking formations on opposite ends thereof, the first and second interlocking formations being configured to interlock with the second and first interlocking formations respectively of other, similar protectors to hold the protectors together end to end.

The interlocking formations allow strips to be connected end-to-end to provide a protective track along which the object may slide. The effort required to move an object along the track is generally much less than that required to move the same object over the bare floor because of reduced friction on the smooth surface of the track. The track may be duplicated where desired, for example to support the feet of an appliance. Because of the interlock, the track does not need to be butted against a wall to prevent separation of the strips where they join.

The strips are preferably equipped with lips along their side edges to ensure that the feet of heavy appliances or furniture do not slide off the strips onto the floor being protected.

It is also preferred that the material from which the strips are made is inert with respect to vinyl floors. Discolouration of vinyl flooring is a problem when some plastic materials are placed in contact with the vinyl.

The strips are useful on any floor surface, and on some floor coverings as well, for example industrial and other carpeting that is not so highly cushioned that the interlocking ends of the strips will come apart.

Strips according to the present invention can be used, where desired, as long term support.

The invention also provides a floor protection kit consisting of a plurality of the strips that may be connected end-to-end.

BRIEF DESCRIPTION OF THE DRAWINGS

In the accompanying drawings, which illustrate an exemplary embodiment of the present invention:

FIG. 1 is a plan view of a strip according to the present invention;

FIG. 2 is an end elevation of a strip according to the present invention; and

FIG. 3 is an isometric view showing plural strips joined into two parallel tracks for supporting an appliance.

DETAILED DESCRIPTION

Referring to the accompanying drawings, there is illustrated a protector strip 10 for protecting floors from damage caused by heavy objects being transported across the floor. The strip is fabricated from a hard plastic material that is inert with respect to vinyl and other flooring materials. The term "hard" is used to indicate that the strip has sufficient rigidity to distribute concentrated loadings on its top surface over a larger area of its bottom surface. The strip may however, have some flexibility.

The protector strip 10 includes a broad web 12 that, in use, rests on the floor. The web has parallel sides and two longitudinally spaced ends 14 and 16. At the end 14, the web is formed into a tongue 18 with undercuts or recesses 20 on its opposite longitudinal sides. At the end 16, the web is formed with a reentrant notch 22 with undercuts or recesses 24 and a narrow neck 25. The tongue and the notch match in configuration so that the tongue will fit into a notch of another, similarly constructed protector strip to prevent the longitudinal separation of the strips.

The strip is provided with two spaced apart lips 26 that extend the length of the strip, along its opposite edges. These inhibit the inadvertent sliding of an object off the protector strip.

As illustrated in FIG. 3, a series of these strips may be connected end-to-end across a floor 28 to provide two parallel tracks on which an appliance 30 may slide in order to protect the floor on which the strips rest.

While one embodiment of the present invention is described in the foregoing, it is to be understood that other embodiments are possible within the scope of the invention, which is to be ascertained solely by the scope of the appended claims.

We claim:

1. A protector for use in supporting or moving heavy objects, said protector comprising an elongate strip of hard plastic material with opposite first and second ends, the strip having first and second interlocking formations on the respective first and second ends thereof, the first and second interlocking formations being configured to interlock with the second and first interlocking formations respectively of other, similar protectors to hold the protectors together end to end, and the strip including: a flat web engageable with a floor to be protected, the web having a smooth, uninterrupted upper surface extending from the first end to the second end; and spaced apart retaining lips extending along an upper surface of the web on opposite sides of said smooth upper surface.

2. A protector according to claim 1 wherein the lips are located along opposite side edges of the web.

3. A protector according to claim 1 wherein the interlocking formations comprise a tongue projecting from one end of the strip and a tongue-receiving notch in the other end of the strip.

4. A protector according to claim 3 wherein the tongue is recessed on opposite sides thereof and the notch has a configuration matching that of the tongue.

5. A floor protection, kit for use in supporting or moving heavy objects, said kit comprising a plurality of elongate strips of hard plastic material, each strip having opposite first and second ends and respective first and second interlocking formations on the respective first and second ends, the first interlocking formations being configured to interlock with the second interlocking formations to hold the strips together end-to-end, and wherein each strip includes a flat web engageable with a floor to be protected, with a smooth, uninterrupted upper surface extending from the first end to the second end, and spaced apart retaining lips extending along an upper surface of the web on opposite sides of said smooth upper surface.

6. A protector according to claim 5 wherein the lips are located along opposite side edges of the web.

7. A kit according to claim 5 wherein the first interlocking formation comprises a tongue projecting from one end of the strip and the second interlocking formation comprises a tongue receiving notch in the other end of the strip.

8. A kit according to claim 7 wherein the tongue is recessed on opposite sides thereof and the notch has a configuration matching that of the tongue.

* * * * *